United States Patent
Brunel et al.

(10) Patent No.: US 9,532,242 B2
(45) Date of Patent: Dec. 27, 2016

(54) METHOD AND A SYSTEM FOR ENABLING A MOBILE TERMINAL TO CONTINUE TO BE SERVED BY A HOME BASE STATION

(71) Applicant: MITSUBISHI ELECTRIC CORPORATION, Chiyoda-ku (JP)

(72) Inventors: Loic Brunel, Rennes (FR); Cristina Ciochina, Rennes (FR)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 14/384,272

(22) PCT Filed: Mar. 20, 2013

(86) PCT No.: PCT/EP2013/055768
§ 371 (c)(1),
(2) Date: Sep. 10, 2014

(87) PCT Pub. No.: WO2013/139828
PCT Pub. Date: Sep. 26, 2013

(65) Prior Publication Data
US 2015/0038089 A1 Feb. 5, 2015

(30) Foreign Application Priority Data
Mar. 21, 2012 (EP) ..................... 12160593

(51) Int. Cl.
*H04B 15/00* (2006.01)
*H04W 24/02* (2009.01)
(Continued)

(52) U.S. Cl.
CPC ........... *H04W 24/02* (2013.01); *H04W 84/005* (2013.01); *H04W 84/045* (2013.01)

(58) Field of Classification Search
CPC ... H04W 24/02; H04W 84/005; H04W 84/045
(Continued)

(56) References Cited

U.S. PATENT DOCUMENTS

| 2007/0242669 A1* | 10/2007 | Achard | H04B 7/022 |
| | | | 370/390 |
| 2010/0093354 A1* | 4/2010 | Agashe | H04W 36/04 |
| | | | 455/436 |

(Continued)

OTHER PUBLICATIONS

3GPP TSG-RAN WG3 Meeting #73bis R3-112553, "Considerations on the scenarios for mobile relay", ZTE, Total 5 Pages, (Oct. 10-14, 2011) XP 002679150.
(Continued)

*Primary Examiner* — Wesley Kim
*Assistant Examiner* — Raj Chakraborty
(74) *Attorney, Agent, or Firm* — Oblon, McClelland, Maier & Neustadt, L.L.P.

(57) ABSTRACT

A method for enabling a mobile terminal to continue to be served by a home base station when the mobile terminal is in a coverage area of the serving home base station and the coverage area of the serving home base station starts superposing with a coverage area of another home base station having a same physical cell identity and being synchronized with the serving home base station, each home base station broadcasting the physical cell identifier in its coverage area. The method includes: determining that the coverage areas start superposing, determining at least one timing offset to be applied at a predetermined moment by at least one of the home base stations for transferring signals in its cell, transmitting to the mobile terminal the at least one timing offset and the moment, and applying the at least one timing offset at the moment.

16 Claims, 9 Drawing Sheets

(51) Int. Cl.
*H04W 84/00* (2009.01)
*H04W 84/04* (2009.01)

(58) Field of Classification Search
USPC .......................................................... 455/501
See application file for complete search history.

(56) References Cited

U.S. PATENT DOCUMENTS

| | | |
|---|---|---|
| 2011/0080896 A1 | 4/2011 | Krishnamurthy et al. |
| 2011/0211537 A1 | 9/2011 | Sivanesan et al. |
| 2011/0274097 A1 | 11/2011 | Zhang et al. |
| 2011/0312317 A1 | 12/2011 | Sahin et al. |
| 2013/0028293 A1* | 1/2013 | Makh .................... H04W 48/12 375/132 |

OTHER PUBLICATIONS

3GPP TSG-RAN WG3 Meeting #74, "PCI usage for mobile relay", Nokia Siemens Networks, Total 2 Pages, (Nov. 14-18, 2011) XP 050566081.
Written Opinion of the international Search Report Issued May 7, 2013 in PCT/EP13/055768 Filed Mar. 20, 2013.
International Search Report Issued May 7, 2013 in PCT/EP13/055768 Filed Mar. 20, 2013.

* cited by examiner

METHOD AND A SYSTEM FOR ENABLING A MOBILE TERMINAL TO CONTINUE TO BE SERVED BY A HOME BASE STATION

The present invention relates generally to a method and a system for enabling a mobile terminal to continue to be served by a home base station when the mobile terminal is in the coverage area of the serving home base station and entering in another coverage area of another home base station, the home base stations having the same physical cell identity and being synchronized.

Wireless cellular telecommunication networks are largely deployed but there are still some areas not covered by the base stations of the wireless cellular telecommunication network.

Solutions are proposed today. Particular base stations, like home base stations or femto base stations, provide coverage areas within the buildings or in moving conveyance like bus, trains or elevators.

Each radio cell of base stations or home base stations has an attached Physical Cell Identity (PCI). The PCI is used to identify the cell in its radio neighborhood. As opposed to some global cell identities or unique identifiers which are uniquely identifying each radio cell in the wireless cellular telecommunication network, the PCI is not unique.

For example, in the 3GPP LTE (Long Term Evolution) standard, there are five hundred four different values available for the PCI, composed of one hundred sixty eight groups of three identities.

In order for a mobile terminal to be able to communicate with a base station or a home base station, the mobile terminal must know the PCI of the corresponding radio cell. PCI knowledge is acquired during the synchronization phase. Synchronization signals are broadcasted at regular intervals by the base stations or the home base stations.

In 3GPP LTE for example, synchronization signals are sent twice per radio frame, every 5 ms placed onto a given number of subcarriers, six resource blocks occupying seventy two subcarriers in the center of the bandwidth. Physical Broadcast Channel (PBCH) is also sent every 10 ms. The Broadcast channel (BCH) carries a part of the System Information (SI), more precisely the Master information block (MIB).

Knowing the PCI of the serving cell, the mobile terminal can determine many system parameters that depend on the PCI value like pilot values, pilot positions, hopping sequences. In 3GPP LTE for example, the UL DM-RS sequence (uplink demodulation reference signal) and group hopping pattern and the CRS (Common RS) sequence depend on the PCI value, and CRS position depends on PCI modulo 6.

When, for example, a macro cell and many femto cells coexist, there is a high probability of having several cells with the same PCI. In static environments, network planning is done such as to avoid having neighboring cells with the same PCI.

In an environment where there are moving home base stations, an itinerant cell may arrive into a neighborhood where a cell with the same PCI already exists. PCI collision may for example occur between the mobile home base station and a fixed home base station or another mobile home base station. The algorithms conceived for a static scenario can no longer be applied.

PCI collision can cause severe effects. If the two cells having the same PCI are synchronized, pilot collision may occur as for instance in 3GPP LTE. In this case, the mobile terminal estimates an erroneous channel consisting of the superposition of the channels between the mobile terminal and respective home base stations that may lead to a loss of the communication link between the serving home base station and the mobile terminal. Moreover, if collision is persistent, the mobile terminal having lost the connection is unable to re-connect to any of the colliding home base stations.

Indeed, in the synchronization phase, the mobile terminal having lost the connection detects strong synchronization signals broadcasted by the former serving home base station and is able to acquire the value of the PCI, but is unable to decode the colliding system information sent by the colliding home base stations.

By system information we understand in the present invention all common information that can be decoded by all the mobile terminals in the radio cell. In LTE for example, system information is composed of MIB (Master Information Block) sent on the physical broadcast channel (PBCH) and System Information Blocks (SIB) sent on the unicast channel (PDSCH, Physical Downlink Shared Channel), the transmission on the unicast channels being scheduled via a common physical downlink control channel (PDCCH).

The present invention aims at providing a solution which enables to avoid PCI collisions.

To that end, the present invention concerns a method for enabling a mobile terminal to continue to be served by a home base station when the mobile terminal is in the coverage area of the serving home base station and the coverage area of the serving home base station starts superposing with the coverage area of another home base station, the other home base station having the same physical cell identity and being synchronized with the serving home base station, each home base station broadcasting the physical cell identifier in its coverage area, characterized in that the method comprises the steps of:

determining that the coverage areas start superposing, determining at least one timing offset to be applied at a predetermined moment by at least one of the home base stations for transferring signals in its cell, transmitting to the mobile terminal the at least one timing offset and the moment, applying the at least one timing offset at the moment.

The present invention concerns also a system for enabling a mobile terminal to continue to be served by a home base station when the mobile terminal is in the coverage area of the serving home base station and the coverage area of the serving home base station starts superposing with the coverage area of another home base station, the other home base station having the same physical cell identity and being synchronized with the serving home base station, each home base station broadcasting the physical cell identifier in its coverage area, characterized in that the system comprises:

means for determining that the coverage areas start superposing, means for determining at least one timing offset to be applied at a predetermined moment by at least one of the home base stations for transferring signals in its cell, means for transmitting to the mobile terminal the at least one timing offset and the moment, means for applying the at least one timing offset at the moment.

Thus, PCI collision is avoided and radio line seizures are avoided.

According to a particular feature, the method comprises further steps of obtaining information allowing the two home base stations to perform a coordinated transmission of at least system information, the coordinated transmission being the transmission by the serving home base station and the other home base station of the same information on the same radio resources at the same time, transmitting to the mobile terminal information enabling the mobile terminal to receive the coordinated transmission and the at least one timing offset and the moment are transferred in the coordinated transmission.

Thus, coordinated transmission of system information is possible in order to continue to transmit system information to the mobile terminals in the cell.

According to a particular feature, the serving home base station and the other home base station further transmit to all other mobile terminals located in their coverage areas information enabling the mobile terminal to receive the coordinated transmission and transmit in the coordinated transmission to all other mobile terminals located in their coverage areas the at least one timing offset and the moment to mobile terminals located in their coverage areas in the coordinated transmission.

Thus, coordinated transmission of system information is possible in order to continue to transmit system information to the mobile terminals in the cell.

According to a particular feature, the home base station serving the mobile:
- broadcasts a message to neighbouring home base stations,
- receives from at least one of the neighbouring home base stations a message in response to the broadcasted message,
- identifies, the other or each other home base station having the same physical identity as the one or each of the ones from which the response message is received.

Thus, two colliding base stations can identify each other without the intervention of another network entity.

According to a particular feature, the determination that the coverage areas start superposing is performed from at least one message transferred by at least one mobile terminal, the message notifying that the mobile terminal detects a collision that occurs from the reception of both physical cell identifiers.

Thus, fast collision detection is based on the behaviour of the mobile terminals.

According to a particular feature, the mobile terminal:
- computes a level of estimated interference on data received by the mobile terminal,
- computes a level of estimated interference on pilot symbols received by the mobile terminal,
- detects the collision from the computed level of estimated interference on data received by the mobile terminal and from the computed level of estimated interference on pilot symbols received by the mobile terminal.

Thus, a mobile terminal can determine that a collision is occurring.

According to a particular feature, the determination that the coverage areas start superposing is performed by the home base station serving the mobile terminal.

Thus, fast collision detection can be performed.

For example, by taking into account plural detections of collisions, the home base station can avoid false PCI collision.

According to a particular feature, the at least one timing offset is determined by both home base stations.

Thus, two colliding base stations rapidly determine at least one timing offset without the intervention of another network entity.

According to a particular feature, one timing offset is determined by the home base station serving the mobile terminal.

Thus, radio link loss with the mobile terminals served by the base station is avoided.

According to a particular feature, the determination that the coverage areas start superposing is performed by the server.

According to a particular feature, the server identifies the other home base station having the same physical cell identity as the physical cell identity of home base station serving the mobile terminal.

Thus, the server can rapidly inform the home base stations of the collision.

According to a particular feature, the method comprises further step executed by the mobile terminal of applying the timing offset at the moment.

Thus, radio link with the serving home base stations is preserved.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the methods according to the invention, they will not be repeated here.

The characteristics of the invention will emerge more clearly from a reading of the following description of an example embodiment, the said description being produced with reference to the accompanying drawings, among which:

Figure 5:
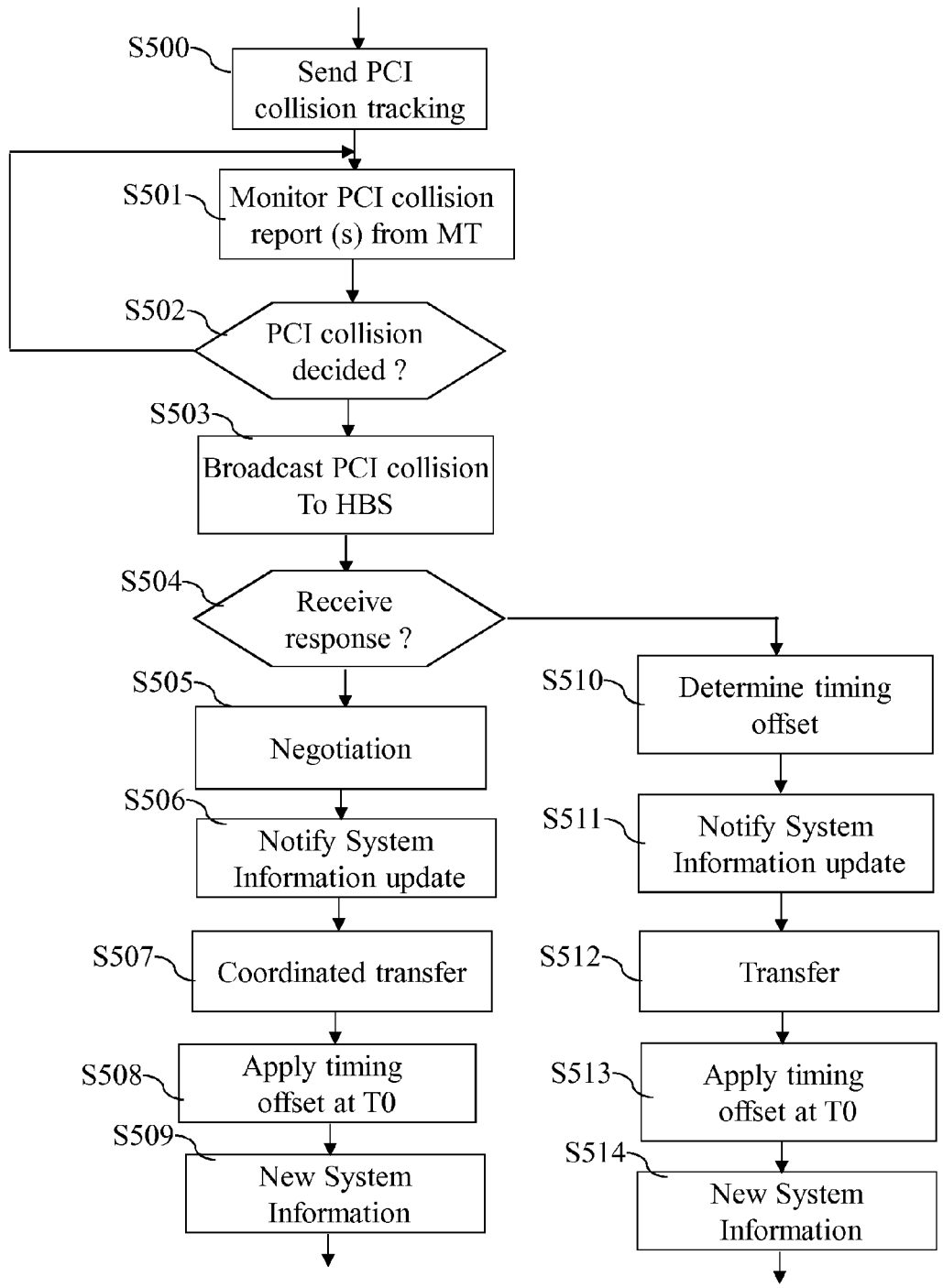
Figure 6:
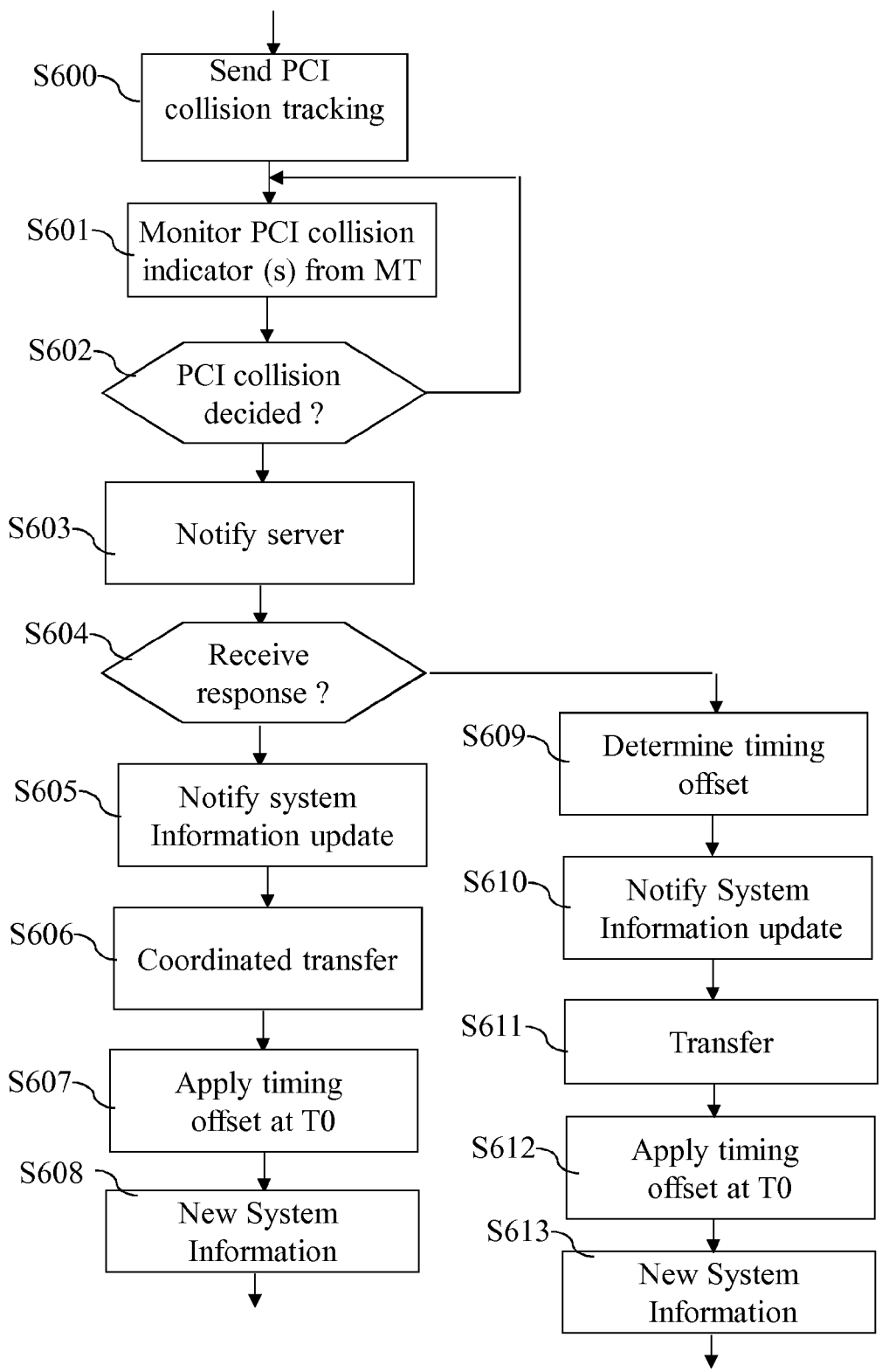
Figure 7:
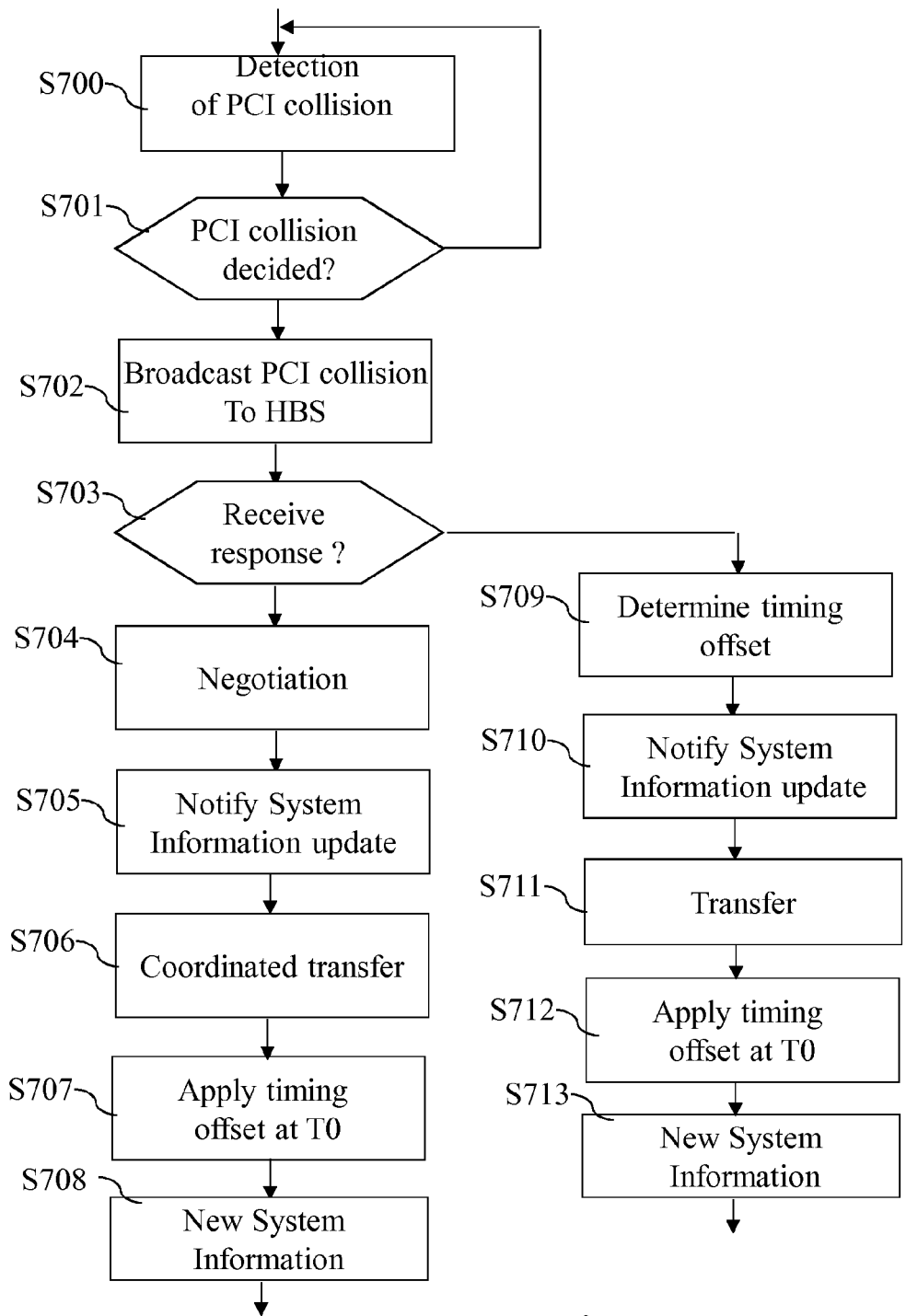
Figure 8:
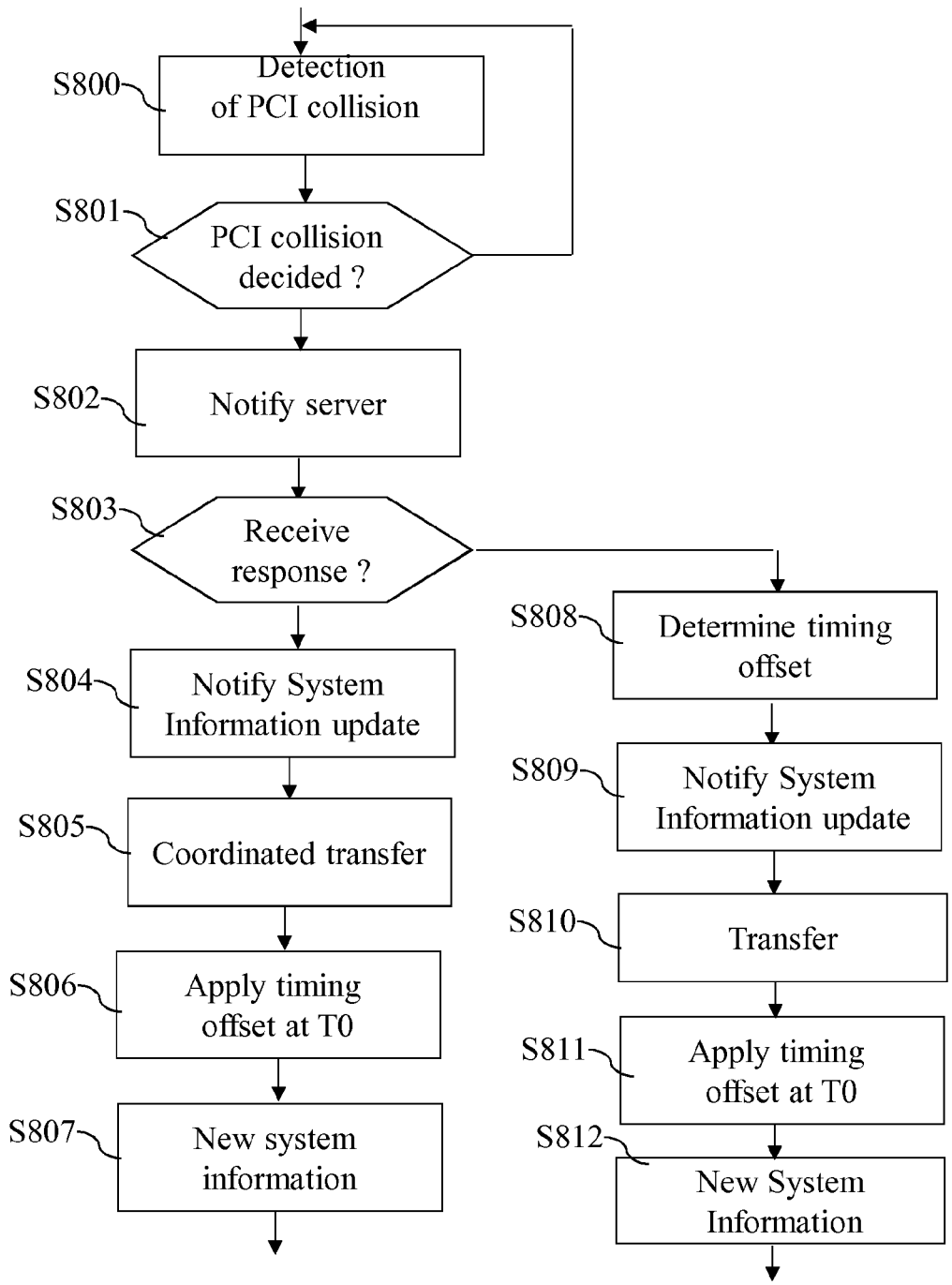
Figure 9:
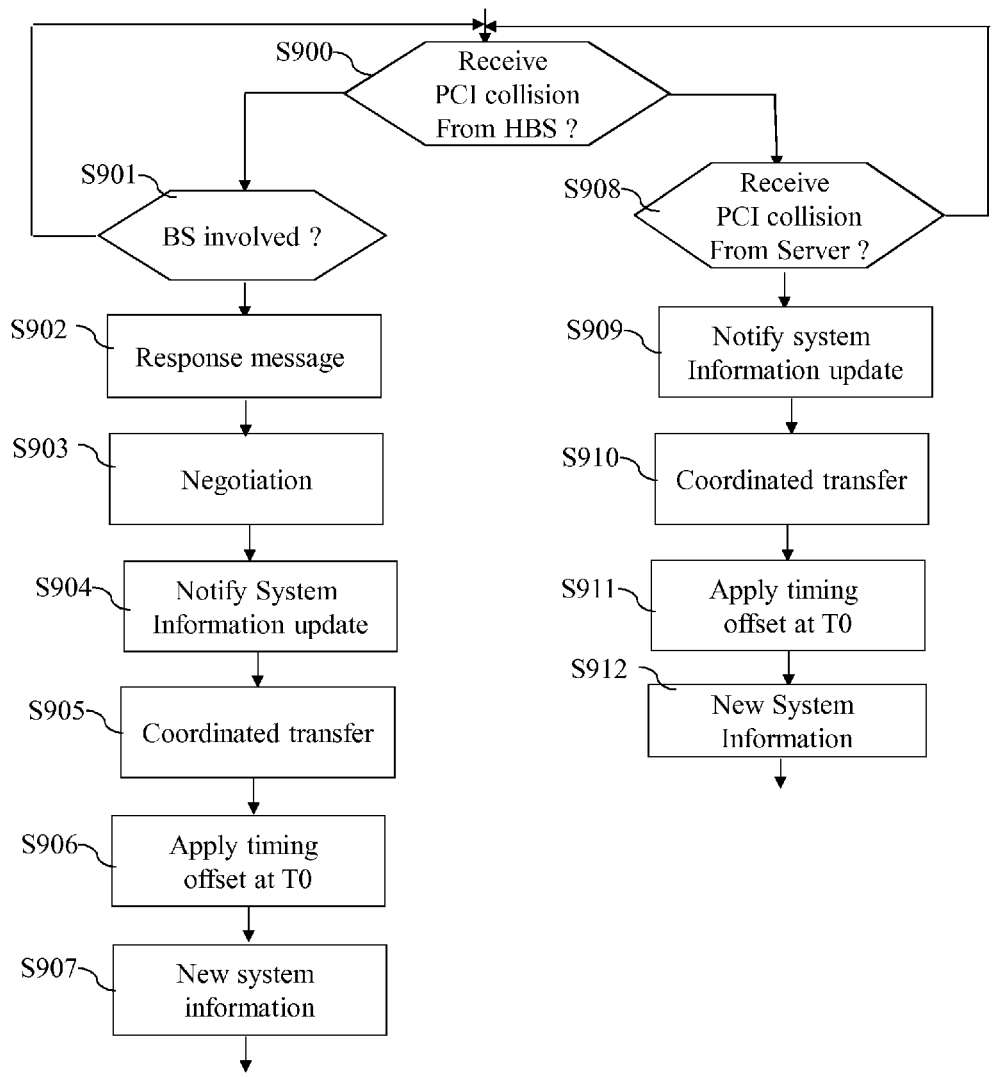
Figures 10, 11:
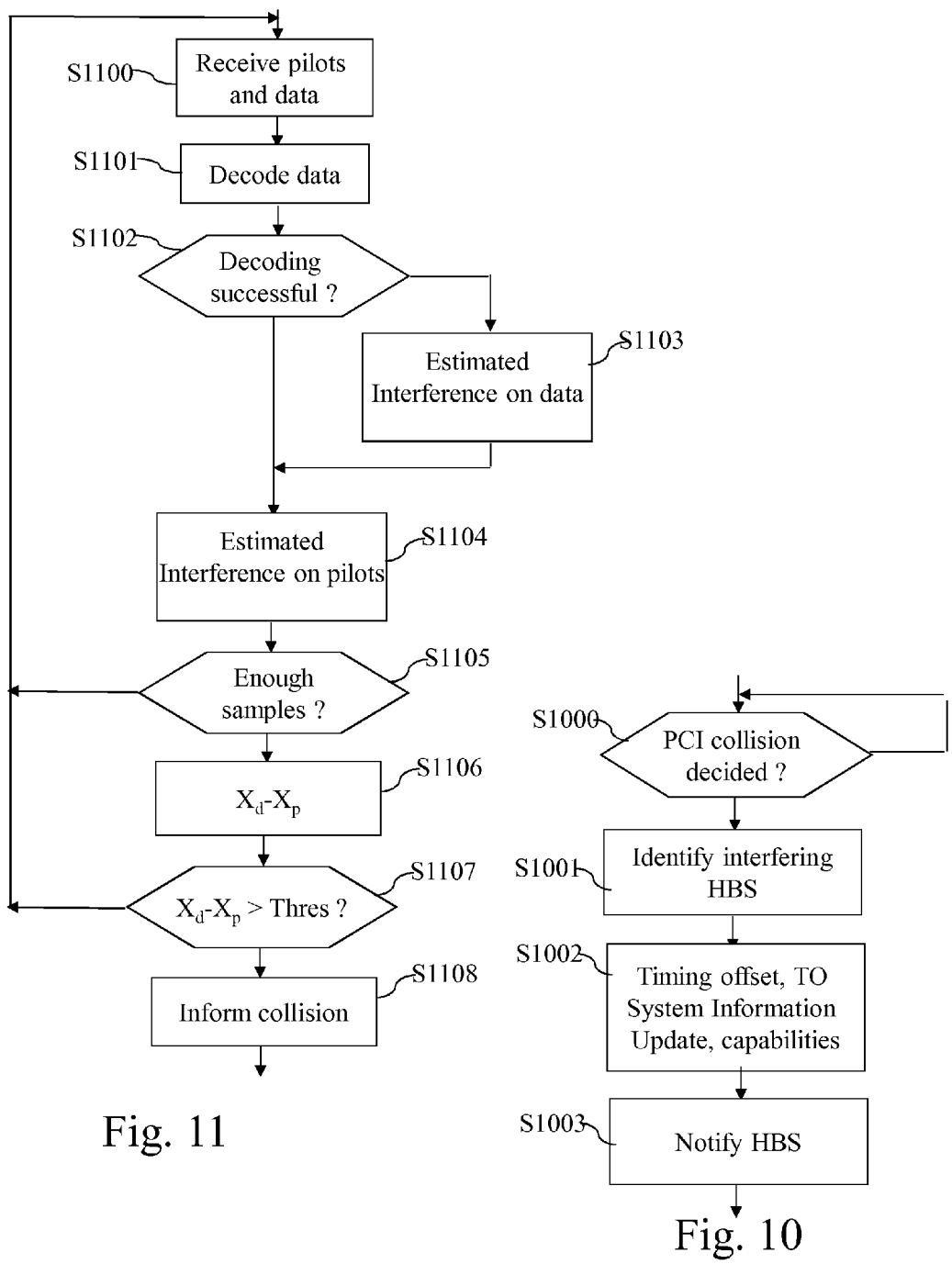
Figures 12, 13:
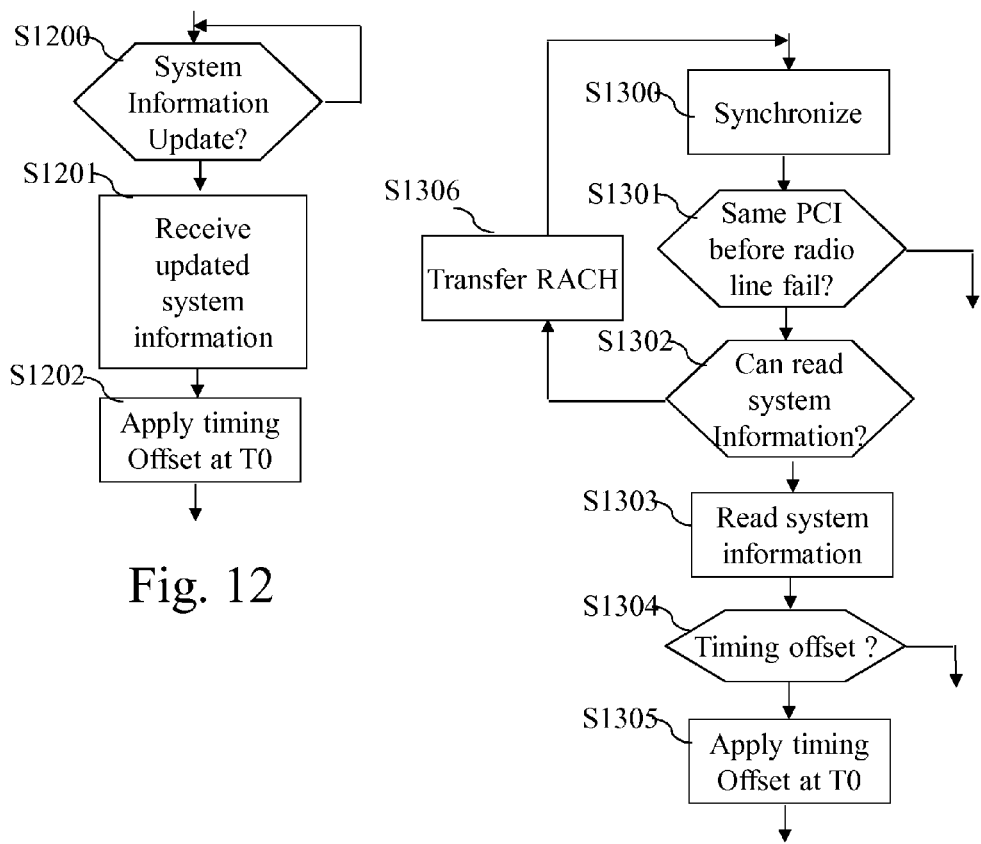

FIG. 5 discloses an example of an algorithm executed by a home base station according to a first mode of realization of the present invention;

FIG. 6 discloses an example of an algorithm executed by a home base station according to a second mode of realization of the present invention;

FIG. 7 discloses an example of an algorithm executed by a home base station according to a third mode of realization of the present invention;

FIG. 8 discloses an example of an algorithm executed by a home base station according to a fourth mode of realization of the present invention;

FIG. 9 discloses an example of an algorithm executed by each home base station according to the present invention;

FIG. 10 discloses an example of an algorithm executed by a server according to the present invention;

FIG. 11 discloses an example of an algorithm executed by a mobile terminal according to the first and second modes of realization of the present invention;

FIG. 12 discloses an example of an algorithm executed by a mobile terminal according to the present invention when the mobile terminal is served by a home base station and when a PCI collision avoidance procedure is undergoing;

FIG. 13 discloses an example of an algorithm executed by a mobile terminal according to the present invention when the mobile terminal is not served by a home base station.

Figure 1:
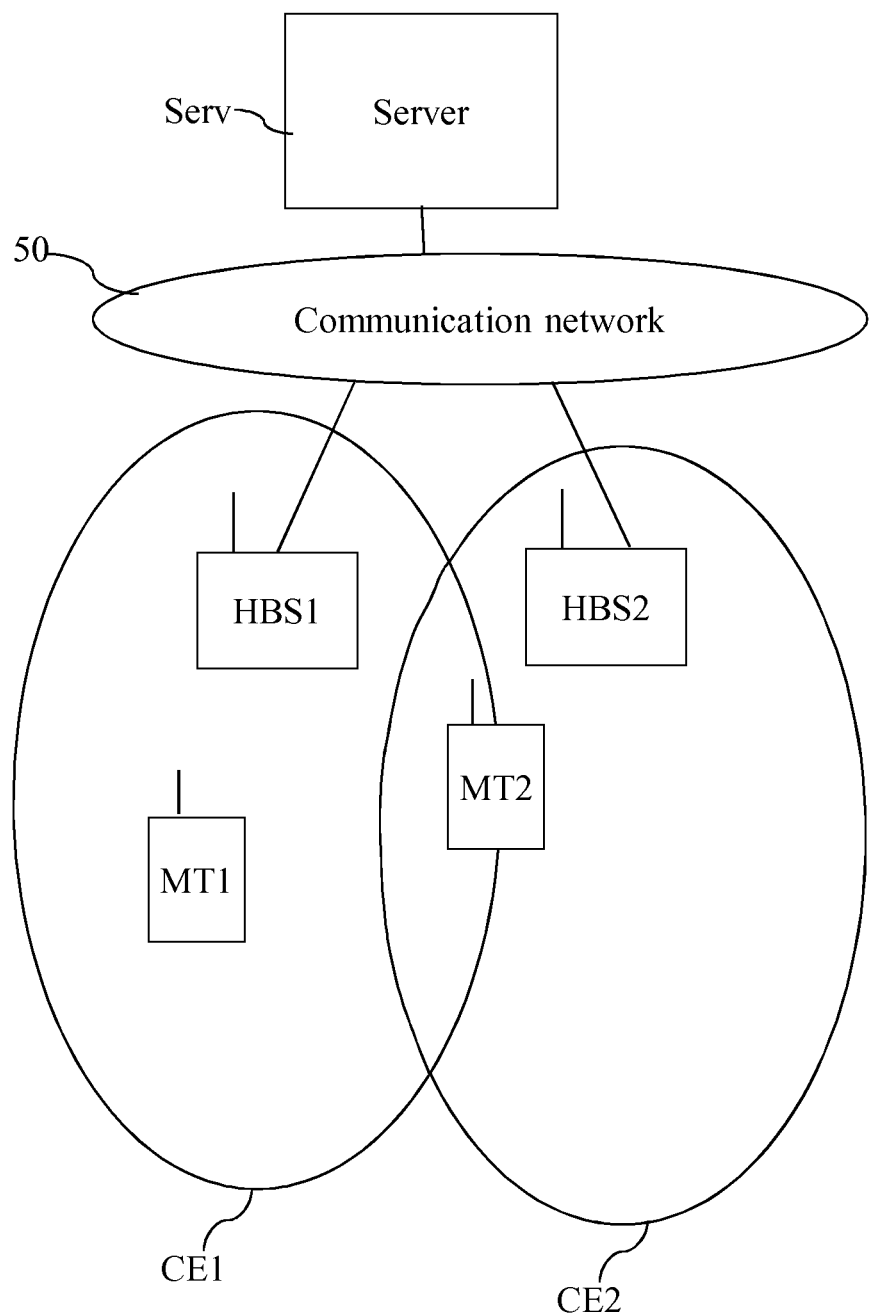
FIG. 1 represents a wireless cellular telecommunication network in which the present invention is implemented.

FIG. 1 represents a wireless cellular telecommunication network in which the present invention is implemented.

The present invention is described in an example wherein home base stations implement the present invention.

In FIG. 1, two home base stations HBS1 and HBS2 of a wireless cellular telecommunication network and two mobile terminals MT1 and MT2 are shown.

Only two home base stations HBS1 and HBS2 and two mobile terminals MT1 and MT2 are shown but we can understand that the present invention is applicable when a more important number of home base stations HBS and/or a more important number of mobile terminals MT exist.

The home base stations HBS1 and HBS2 can also be femto base stations or pico base stations or relays.

The home base station HBS1 is for example located in a moving conveyance, not shown in FIG. 1, like a train or a bus or an elevator and enables mobile terminals MT1 and MT2 located within the moving conveyance to establish or continue a communication with a remote telecommunication device through the home base station HBS1.

The home base station HBS1 is able to receive signals transferred by mobile terminals MT which are located in the area CE1. The home base station HBS1 transfers signals which can be received and processed by mobile terminals MT located in the area CE1. The area CE1 is the coverage area of the home base station HBS1.

The home base station HBS2 may be located in a given position, for example in buildings surrounding the path of the moving conveyance. The home base station HBS2 may be located in a moving conveyance different from the one the home base station HBS1 is located in.

The home base station HBS2 is able to receive signals transferred by mobile terminals MT which are located in the area CE2. The home base station HBS2 transfers signals which can be received and processed by mobile terminals MT located in the area CE2. The area CE2 is the coverage area of the home base station HBS2.

The mobile terminals MT1 and MT2 are served by the home base station HBS1.

When a mobile terminal MT is served by or attached to a home base station HBS, it can receive a message and/or establish a communication with a remote telecommunication device through the home base station HBS. The mobile terminal has thus already acquired knowledge of the PCI of the serving station during the synchronization phase.

A base station or home base station may have several cells. The present invention is disclosed, for the sake of clarity, when each base station or home base station has a single cell, the PCI identifies the home base station in its radio neighborhood, and the unique identifier uniquely identifies the home base station in the network.

The home base stations HBS1 and HBS2 have the same Physical Cell Identity and are synchronized.

While in communication with the home base station HBS1, the mobile terminals MT1 and MT2 estimate the downlink channel based on the pilots symbols sent by the home base station HBS1.

For example, in 3GPP Long Term Evolution, usually referred to as LTE, home base stations or base stations transfer in the downlink channel, i.e. the channel for transferring signals to mobile terminals, for example cell-specific Common Reference Signals (CRS) which are used for channel estimation by the mobile terminals MT. The positions of the CRS depend on the PCI modulo 6 value.

For example, in 3GPP Long Term Evolution Advanced, usually referred to as LTE-A, besides Common Reference Signals, downlink demodulation reference signals (DM-RS) are also used. Downlink demodulation reference signals are mobile terminal MT specific pilots precoded in the same way as the data and allowing the mobile terminal MT to estimate the downlink channel used for mobile terminal MT specific data transmission.

The estimated channel is used for decoding the data received by the mobile terminal MT. Data can be user-specific data e.g. Physical Downlink Shared Channel (PDSCH) or control data, e.g. Physical Downlink Control Channel (PDCCH).

In the following, we will denote by "pilots" the cell specific pilots (e.g., Common Reference Signals in 3GPP LTE) and by "data" the control and/or data decoded using the channel estimation based on cell-specific pilots.

In the case where PCI collision is occurring, the mobile terminal MT2 experiences an increasing estimated level of interference on the data part, while the estimated level of interference on the pilot part is not significantly impacted.

The home base stations HBS1 and HBS2 may be linked together through a communication network 50 or may be linked to a server Sery which controls the operation of a group of home base stations including the home base stations HBS1 or HBS2. In some system architectures, the server Sery may not exist.

The communication network 50 is, for the home base station HBS1, a wireless network.

The communication network 50 may be, for the home base station HBS2, a DSL (Digital Subscriber Line) network, or an ISDN (Integrated Services Digital Network) network, or a wireless network etc.

According to the invention, if PCI collision occurs, at least one timing offset is determined to be applied at a predetermined moment by at least one of the home base stations for transferring signals in its coverage area. The mobile terminals attached to any of the home base stations HBS1 or HBS2 which became aware of the collision are notified of the at least one timing offset and of the moment when the said timing offset is applied.

Figure 2:
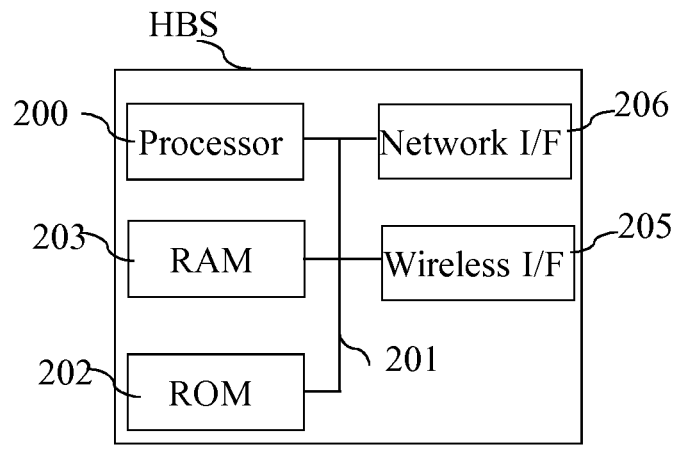
FIG. 2 is a diagram representing the architecture of a home base station in which the present invention is implemented.

FIG. 2 is a diagram representing the architecture of a home base station in which the present invention is implemented.

The home base station HBS has, for example, an architecture based on components connected together by a bus 201 and a processor 200 controlled by the programs as disclosed in FIGS. 5, 6, 7, 8 and 9.

The bus 201 links the processor 200 to a read only memory ROM 202, a random access memory RAM 203, a wireless interface 205 and a network interface 206.

The memory 203 contains registers intended to receive variables and the instructions of the programs related to the algorithms as disclosed in FIGS. 5, 6, 7, 8 and 9.

The processor 200 controls the operation of the network interface 206 and of the wireless interface 205.

The read only memory 202 contains instructions of the programs related to the algorithms as disclosed in FIGS. 5, 6, 7, 8 and 9, which are transferred, when the home base station HBS is powered on, to the random access memory 203.

The home base station HBS may be connected to a telecommunication network through the network interface 206. For example, the network interface 206 is a DSL (Digital Subscriber Line) modem, or an ISDN (Integrated Services Digital Network) interface, or a wireless interface etc. Through the network interface 206, the base home station BS may transfer messages to the server Serv or to neighbouring home base stations HBS. It has to be noted here that the network interface 206 is, for the home base station HBS1, a wireless interface.

The wireless interface 205 and the network interface 206 are used by a mobile terminal MT in order to access to the wireless cellular telecommunication network when the mobile terminal MT receives or establishes a communication with a remote telecommunication device.

Figure 3:
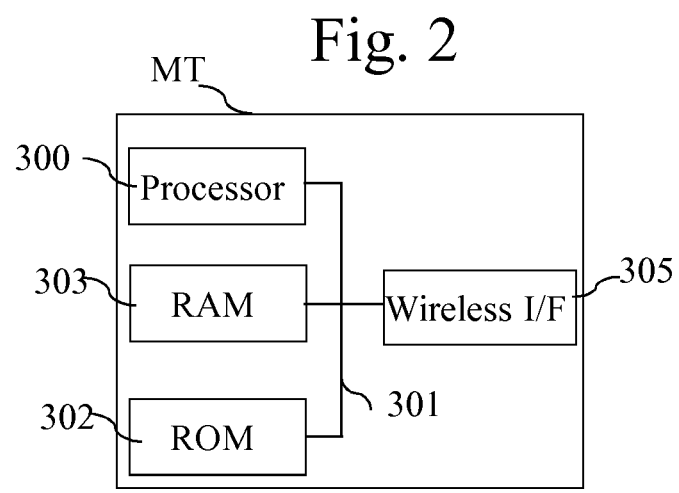
FIG. 3 is a diagram representing the architecture of a mobile terminal in which the present invention is implemented.

FIG. 3 is a diagram representing the architecture of a mobile terminal in which the present invention is implemented.

The mobile terminal MT has, for example, an architecture based on components connected together by a bus 301 and a processor 300 controlled by the programs as disclosed in FIGS. 11, 12 and 13.

The bus 301 links the processor 300 to a read only memory ROM 302, a random access memory RAM 303 and a wireless interface 305.

The memory 303 contains registers intended to receive variables and the instructions of the programs related to the algorithms as disclosed in FIGS. 11, 12 and 13.

The processor 300 controls the operation of the wireless interface 305.

The read only memory 302 contains instructions of the programs related to the algorithms as disclosed in FIGS. 11, 12 and 13, which are transferred, when the mobile terminal MT is powered on, to the random access memory 303.

The wireless interface 305 comprises means for receiving signal representative of pilots and data, means for decoding data, CRC check means, means for synchronizing with synchronization signals transferred by at least one home base station, means for obtaining at least one PCI transferred by at least one home base station HBS and means for notifying PCI collisions detections.

Figure 4:
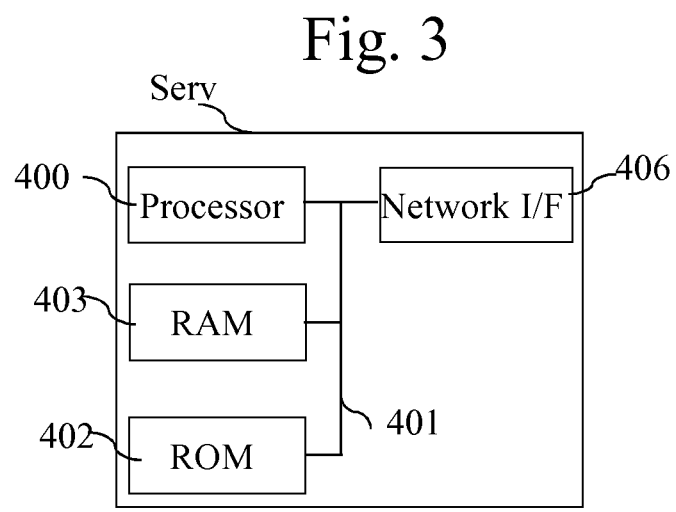
FIG. 4 is a diagram representing the architecture of a server in which the present invention is implemented.

FIG. 4 is a diagram representing the architecture of a server in which the present invention is implemented.

The server Serv has, for example, an architecture based on components connected together by a bus 401 and a processor 400 controlled by the program as disclosed in FIG. 10.

The bus 401 links the processor 400 to a read only memory ROM 402, a random access memory RAM 403, and a network interface 406.

The memory 403 contains registers intended to receive variables and the instructions of the program related to the algorithm as disclosed in FIG. 10.

The processor 400 controls the operation of the network interface 406.

The read only memory 402 contains instructions of the program related to the algorithms as disclosed in FIG. 10, which are transferred, when the server Serv is powered on, to the random access memory 403.

The server Serv may be connected to a telecommunication network through the network interface 406. For example, the network interface 406 is a DSL (Digital Subscriber Line) modem, or an ISDN (Integrated Services Digital Network) interface, or a wireless interface or a combination of them. Through the network interface 406, the server Serv may transfer to or receive messages from home base stations HBS.

The server Serv can be a separate network entity or can be another network member with a higher hierarchical role than the home base stations HBS. For example, the server Serv can be a macro base station when the home base stations HBS are relays.

FIG. 5 discloses an example of an algorithm executed by a home base station according to a first mode of realization of the present invention.

More precisely, the present algorithm is executed by the processor 200 of each home base station HBS.

The present algorithm is disclosed in an example where it is executed by the home base station HBS1.

The present algorithm is disclosed in an example where only one interfering home base station HBS2 exists. More interfering home base stations HBS may exist in practice.

At step S500, the processor 200 commands the wireless interface 205 in order to transfer a collision tracking request message to at least a part of the mobile terminals MT the home base station HBS1 serves.

The message may be transferred to each mobile terminal MT served by the home base station or only to some mobile terminals, for example mobile terminal or terminals MT located at the coverage area edge of the home base station HBS1.

In a variant, all mobile terminals MT execute by default the PCI collision tracking. In this case, step S500 is omitted.

At next step S501, the processor 200 commands the wireless interface 205 in order to monitor if at least one PCI collision report is received from at least one mobile terminal MT indicating that at least one mobile terminal MT detects a PCI collision.

For example, if the mobile terminal MT monitoring for PCI collision and experiencing a PCI collision event is still able to decode the downlink control signaling transferred by the home base station HBS1, the mobile terminal MT is still attached to the serving home base station HBS1. In this case, the mobile terminal MT may transfer a PCI collision report to the serving home base station HBS1.

The PCI collision report can be sent in the uplink channel between the mobile terminal MT and the serving home base station HBS1 either via the physical layer (PHY), or via the media access control (MAC) layer, or via the Radio Resource Control (RRC) layer.

In the physical layer, a special physical uplink control channel format including a specific bit for PCI collision report may be used. For example, if a PCI collision is detected the specific bit is set to one, otherwise the specific bit is set to null value.

If the PCI collision is already severe, the mobile terminal MT can not determine information indicating which uplink resources are allocated to it by the serving home base station HBS for scheduled messages. The mobile terminal MT is no longer able to communicate with the serving home base station HBS1 and falls into a Radio Link Failure (RLF) before being able to inform the serving home base station HBS of the occurring PCI collision.

In this case, the mobile terminal MT tries to inform the home base station HBS1, for example, by sending a random access request on a random access channel (RACH) based on the previous system information known before the Radio Link Failure and which might be outdated.

The random access channel is a resource of the uplink channel allocated for the transfer of non scheduled messages.

For example, the random access request comprises a specific bit indicating PCI collision or comprises a temporary identifier, with a preamble specific to PCI collision occurrence. The preamble may be signalled by the home base station HBS1 in the system information or may be predefined in the wireless cellular telecommunication network or may be transferred to the mobile terminal MT through Radio Resource Control (RRC).

According to a particular feature, a RACH resource dedicated for PCI collision signaling can be reserved in the uplink channel at a specific position in the time/frequency/code domain for all home base stations HBS. Therefore, the random access request sent by the mobile terminal MT trying to inform its serving home base station HBS1 of the PCI collision can be read by any synchronized and potentially interfering home base station HBS2 in the neighborhood. The random access request contains the PCI and possibly the unique identifier of the interfered home base station HBS1 in order to enable the interfering home base station HBS2 to detect that it is involved in a PCI collision event.

At step S502, the processor 200 checks if at least a collision is reported and decides whether PCI collision is occurring or not. As far as no collision is decided, the processor 200 executes the loop constituted by the steps S501 and S502.

At step S503, the processor 200 commands the network interface 206 in order to command the transfer of a broadcasting message through the communication network in order to notify neighboring home base stations that PCI collision is occurring.

The message comprises at least the unique identifier of the home base station HBS1 and the PCI of the home base station HBS1.

At next step S504, the processor 200 checks if a message is received by the network interface 206 in response to the message transferred at step S503.

If the interfering home base station HBS2, having the same PCI as the one comprised in the message transferred at step S503, becomes aware that it is involved in the PCI collision, the interfering home base station HBS2 transfers a response to the home base station HBS1. The message may include, for example, the unique identifier of the interfering home base station HBS2.

In a variant of realization, the interfering home base station HBS2 may be aware that it is involved in the PCI collision via mobile terminals MT reports or RACH messages transferred by mobile terminals MT.

If a message is received by the network interface 206 within a given timeframe, for example 100 ms, the processor 200 moves to step S505. Otherwise, the processor 200 moves to step S510.

At step S505, the interfered home base station HBS1 and the interfering home base station HBS2 begin a negotiation phase. For example, during the negotiation, at least one non-null timing offset is determined between the interfered and the interfering home base stations HBS in order to desynchronize the interfered home base station HBS1 and the interfering home base station HBS2.

By desynchronizing the interfered home base station HBS1 and the interfering home base station HBS2, the CRS transferred by the interfered home base station HBS1 and the interfering home base station HBS2 are no longer superposed, the channel estimation performed by mobile terminals MT becomes then more accurate.

Also, a moment T0 from which the at least one timing offset will be applied is also determined. Furthermore, capabilities, like the number of antennas of the home base stations HBS and/or MIMO capabilities, that can be used by the less capable home base station involved in the PCI collision are determined and selected. Any other information allowing the two home base stations to align the transmission of their system information is also exchanged. Such information may include, for example, in addition to the system information itself, control signaling information for the scheduling of the part of system information embedded in the downlink shared channel.

It has to be noted that two different timing offsets may be defined, one for each home base station HBS involved in the PCI collision.

At next step S506, the processor 200 of the home base station HBS1 commands the transfer of a message to the mobile terminals MT in the cell CE1, both those in idle mode and those in connected mode, that a system information update will be performed. The notification can be sent for example by paging the mobile terminals MT in idle mode, or by using a specific tag in the information that is constantly monitored by the mobile terminals in connected mode. In LTE for example, the mobile terminals MT in connected mode are notified by using a value tag in System Information Block 1 (SIB1) which is incremented every time one or more system information messages change.

It has to be noted here that the home base station HBS2 notifies the mobile terminals MT in its cell, both those in idle mode and those in connected mode, that a system information update will be performed.

At next step S507, the processor 200 commands the wireless interface 205 in order to transfer system information to the mobile terminals MT. Both interfered home base station HBS1 and interfering home base station HBS2 transfer in a synchronized manner the same system information, using the same resources and the same capabilities which are at most the ones of the home base station having the less capabilities. System information is updated in conformity with the information obtained during the negotiation phase. System information is appended to include the at least one timing offset, the unique home base station HBS identity/identities to which the timing offset(s) corresponds, and the moment T0 from which the at least one timing offset will be applied. In a variant, T0 can be a default absolute or relative value predetermined in the system, in which case there is no need of deciding or transmitting this value.

The two colliding home base stations HBS1 and HBS2 are able to coordinate and transmit common broadcast channel, system information and control signaling according to the information directly exchanged in the negotiation phase. The common channels are set up corresponding to the capabilities of the less capable home base station HBS involved in the collision. Thus, the radio link with the attached mobile terminals MT can be preserved and global radio link failure is avoided. For instance, in LTE, where multi-antenna transmission is possible, PBCH, PDCCH and PDSCH carrying SIB must be sent using at most the number of antennas of the HBS having the least number of antennas among the two colliding home base stations HBS1 and HBS2.

At step S508, the processor 200 commands the wireless interface 205 in order to apply the timing offset at time T0.

At next step S509, the processor 200 commands the wireless interface 205 in order to transfer new system information corresponding to single cell transmission.

The new system information correspond to non-coordinated transmission, for example the one used before step S504. System Information update generally includes notifying all the mobile terminals MT, in active or in idle mode, in its cell that SI changes, and then effectively applying the update.

After that the processor 200 returns to step S500.

At step S510, the processor 200 determines a new timing offset by its own.

At next step S511, the processor 200 of the home base station HBS1 notifies the mobile terminals MT in the cell CE1, both those in idle mode and those in connected mode, that a system information update will be performed. The notification can be sent for example by paging the mobile terminals MT in idle mode, or by using a specific tag in the information that is constantly monitored by the mobile terminals MT in connected mode. In LTE for example, the mobile terminals in connected mode are notified by using a value tag in SIB1 which is incremented every time one or more system information messages change.

At step S512, the processor 200 commands the wireless interface 205 in order to transfer system information to the mobile terminals MT. System information is appended to include the timing offset determined at step S510, and the moment T0 from which the at least one timing offset will be applied. In a variant, T0 can be a default absolute or relative value predetermined in the system, in which case there is no need of deciding or transmitting this value.

At step S513, the processor 200 commands the wireless interface 205 in order to apply the timing offset at time T0.

At step S514, the processor 200 commands the wireless interface 205 in order to transfer new system information corresponding to normal transmission. Timing offset information is removed from the system information. The new system information correspond to normal transmission, for example the one used before step S504. System information update generally includes notifying all the mobile terminals MT, in active or idle mode, in the cell that SI changes, and then effectively applying the update.

After that, the processor 200 returns to step S500.

It has to be noted here that in a variant, the processor 200 does not execute the steps S510 to S514 and returns to step S500 if no response is received at step S504 within a given timeframe.

FIG. 6 discloses an example of an algorithm executed by a home base station according to a second mode of realization of the present invention.

More precisely, the present algorithm is executed by the processor 200 of each home base station HBS.

The present algorithm is disclosed in an example where it is executed by the home base station HBS1.

The present algorithm is disclosed in an example where only one interfering base station HBS2 exists. More interfering home base stations HBS may exist in practice.

At step S600, the processor 200 commands the wireless interface 205 in order to transfer a collision tracking request message to at least a part of the mobile terminals MT the home base station HBS1 serves.

The message may be transferred to each mobile terminal MT served by the home base station or only to some mobile terminals, for example mobile terminal or terminals MT located at the coverage area edge of the home base station HBS1.

In a variant, all mobile terminals MT execute by default PCI collision tracking. In this case, step S500 is omitted.

At next step S601, the processor 200 commands the wireless interface 205 in order to monitor if at least one PCI collision report is received from at least one mobile terminal MT indicating that at least one mobile terminal MT detects a PCI collision as disclosed at step S501 of FIG. 5.

At step S602, the processor 200 checks if at least a collision is reported and decides whether PCI collision is occurring or not. As far as no collision is decided, the processor 200 executes the loop constituted by the steps S601 and S602.

At step S603, the processor 200 commands the network interface 206 in order to command the transfer of a message through the communication network 50 in order to notify the server Serv that PCI collision is occurring.

The message comprises at least the unique identifier of the home base station HBS1 and the PCI of the home base station HBS1.

At next step S604, the processor 200 checks if a message is received from the server Serv in response to the message transferred at step S603.

If a message is received from the server Serv within a given timeframe, the processor 200 moves to step S605. Otherwise, the processor 200 moves to step S609.

The message received at step S604 comprises at least one timing offset, the unique home base station HBS identity/identities to which the timing offset(s) corresponds, and the moment T0 from which the at least one timing offset will be applied. In a variant, T0 can be a default absolute or relative value predetermined in the system, in which case there is no need of deciding or transmitting this value. If several timing offsets are decided, at least one must be non-null.

Furthermore, capabilities, like the number of antennas of the home base stations HBS and/or MIMO capabilities, of the less capable home base station involved in the PCI collision are received and information allowing the two home base stations to align the transmission of their system information is also received. Such information may include, for example, in addition to the system information itself, control signaling information for the scheduling of the part of system information embedded in the downlink shared channel.

At step S605, the processor 200 of the home base station HBS1 commands the transfer of a message to the mobile terminals MT in the cell CE1, both those in idle mode and those in connected mode, that a system information update will be performed. The notification can be sent for example by paging the mobile terminals MT in idle mode, or by using a specific tag in the information that is constantly monitored by the mobile terminals in connected mode. In LTE for example, the mobile terminals MT in connected mode are notified by using a value tag in SIB1 which is incremented every time one or more system information messages change.

It has to be noted here that the home base station HBS2 notifies the mobile terminals MT in its cell, both those in idle mode and those in connected mode, that a system information update will be performed.

At next step S606, the processor 200 commands the wireless interface 205 in order to transfer system information to the mobile terminals MT. Both interfered home base station HBS1 and interfering home base station HBS2 transfer in a synchronized manner the same system information, using the same capabilities and the same resources. System information are updated in conformity with the information obtained in the message received at step S604. System information are appended to include the at least one timing offset, the unique home base station HBS identity/identities to which the timing offset(s) corresponds, and the moment T0 from which the at least one timing offset will be applied. In a variant, T0 can be a default absolute or relative value predetermined in the system, in which case there is no need of deciding or transmitting this value.

The two colliding home base stations HBS1 and HBS2 are able to coordinate and transmit common broadcast channel, system information and control signaling according to the information directly exchanged in the negotiation phase. The common channels are set up corresponding at most to the capabilities of the less capable home base station HBS involved in the collision. Thus, the radio link with the attached mobile terminals MT can be preserved and global radio link failure is avoided. For instance, in LTE, where multi-antenna transmission is possible, PBCH, PDCCH and PDSCH carrying SIB must be sent using at most the number of antennas of the HBS having the least number of antennas among the two colliding home base stations HBS1 and HBS2.

At step S607, the processor 200 commands the wireless interface 205 in order to apply the timing offset at time T0.

At next step S608, the processor 200 commands the wireless interface 205 in order to transfer new system information corresponding to single cell transmission.

The new system information correspond to non-coordinated transmission, for example the one used before step S604. System Information update generally includes notifying all the mobile terminals MT, in active or in idle mode, in the cell that SI changes, and then effectively applying the update.

After that the processor returns to step S600.

At step S609, the processor 200 determines a new timing offset by its own.

At next step S610, the processor 200 of the home base station HBS1 notifies the mobile terminals MT in the cell CE1, both those in idle mode and those in connected mode, that a system information update will be performed as disclosed at step S511 of FIG. 5.

At step S611, the processor 200 commands the wireless interface 205 in order to transfer system information to the mobile terminals MT. System information are appended to include the timing offset determined at step S609, and the moment T0 from which the at least one timing offset will be applied. In a variant, T0 can be a default relative or absolute value predetermined in the system, in which case there is no need of deciding or transmitting this value.

At step S612, the processor 200 commands the wireless interface 205 in order to apply the timing offset at time T0.

At step S613, the processor 200 commands the wireless interface 205 in order to transfer new system information corresponding to normal transmission. Timing offset information is removed from the system information. The new system information correspond to normal transmission, for example the one used before step S604. System information update generally includes notifying all the mobile terminals MT, in active or idle mode, in the cell that SI changes, and then effectively applying the update.

After that, the processor 200 returns to step S600.

It has to be noted here that in a variant, the processor 200 does not execute the steps S609 to S613 and returns to step S600 if no response is received at step S604 within a given timeframe.

FIG. 7 discloses an example of an algorithm executed by a home base station according to a third mode of realization of the present invention.

More precisely, the present algorithm is executed by the processor 200 of each home base station HBS.

The present algorithm is disclosed in an example where it is executed by the home base station HBS1.

The present algorithm is disclosed in an example where only one interfering base station HBS2 exists. More interfering home base stations HBS may exist in practice.

At step S700, the processor 200 starts a PCI detection procedure. For example, the processor 200 monitors the measurement reports transferred by mobile terminals MT such as Channel Quality Information (CQI) reports or pilot power reports, like Reference Signal Received Power (RSRP) reports in 3GPP LTE.

For example, if the radio links between plural mobile terminals served by the home base station HBS and the home base station fail, the processor 200 determines that a PCI collision occurs.

At step S701, the processor 200 checks if a collision is detected. As far as no collision is detected, the processor 200 executes the loop constituted by the steps S700 and S701.

At step S702, the processor 200 commands the network interface 206 in order to command the transfer of a broadcasting message through the communication network in order to notify neighboring home base stations HBS that PCI collision is occurring as disclosed at step S503 of FIG. 5.

At next step S703, the processor 200 checks if a message is received by the network interface 206 in response to the message transferred at step S702.

If a message is received by the network interface 206 within a given timeframe, the processor 200 moves to step S704. Otherwise, the processor 200 moves to step S709.

At step S704, the interfered and the interfering home base stations HBS begin a negotiation phase as disclosed at step S505 of FIG. 5.

At next step S705, the processor 200 of the home base station HBS1 commands the transfer of a message to the mobile terminals MT in its cell, both those in idle mode and those in connected mode, that a system information update will be performed as disclosed at step S506 of FIG. 5.

It has to be noted here that the home base station HBS2 notifies the mobile terminals MT in its cell, both those in idle mode and those in connected mode, that a system information update will be performed.

At next step S706, the processor 200 commands the wireless interface 205 in order to transfer system information to the mobile terminals MT. Both interfered home base station HBS1 and interfering home base station HBS2 transfer in a synchronized manner the same system information, using the same resources and the same capabilities which are at most the one of the home base station having the less capabilities. System information are updated in conformity with the information obtained during the negotiation phase. System information are appended to include the at least one timing offset, the unique home base station HBS identity/identities to which the timing offset(s) corresponds, and the moment T0 from which the at least one timing offset will be applied. In a variant, T0 can be a default absolute or relative value predetermined in the system, in which case there is no need of deciding or transmitting this value.

The two colliding home base stations HBS1 and HBS2 are able to coordinate and transmit common system information as disclosed at step S507 of FIG. 5.

At step S707, the processor 200 commands the wireless interface 205 in order to apply the timing offset at time T0.

At next step S708, the processor 200 commands the wireless interface 205 in order to transfer new system information corresponding to single cell transmission.

The new system information correspond to non-coordinated transmission, for example the one used before step S703. System Information update generally includes notifying all the mobile terminals MT, in active or in idle mode, in its cell that SI changes, and then effectively applying the update.

After that the processor 200 returns to step S700.

At step S709, the processor 200 determines a new timing offset by its own.

At next step S710, the processor 200 of the home base station HBS1 notifies the mobile terminals MT in its cell, both those in idle mode and those in connected mode, that a system information update will be performed as disclosed at step S511 of FIG. 5.

At step S711, the processor 200 commands the wireless interface 205 in order to transfer system information to the mobile terminals MT. System information are appended to include the timing offset determined at step S709, and the moment T0 from which the at least one timing offset will be applied. In a variant, T0 can be a default absolute or relative value predetermined in the system, in which case there is no need of deciding or transmitting this value.

At step S712, the processor 200 commands the wireless interface 205 in order to apply the timing offset at time T0.

At step S713, the processor 200 commands the wireless interface 205 in order to transfer new system information corresponding to normal transmission. Timing offset information is removed from the system information. The new system information correspond to normal transmission, for example the one used before step S703. System information update generally includes notifying all the mobile terminals MT, in active or idle mode, in the cell that SI changes, and then effectively applying the update.

After that, the processor 200 returns to step S700.

It has to be noted here that in a variant, the processor 200 does not execute the steps S709 to S713 and returns to step S700 if no response is received at step S704 within a given timeframe.

FIG. 8 discloses an example of an algorithm executed by a home base station according to a fourth mode of realization of the present invention.

More precisely, the present algorithm is executed by the processor 200 of each home base station HBS.

The present algorithm is disclosed in an example where it is executed by the home base station HBS1.

The present algorithm is disclosed in an example where only one interfering base station HBS2 exists. More interfering home base stations HBS may exist in practice.

At step S800, the processor 200 starts a PCI detection procedure as disclosed at step S700 of FIG. 7.

At step S801, the processor 200 checks if a collision is detected. As far as no collision is detected, the processor 200 executes the loop constituted by the steps S800 and S801.

At step S802, the processor 200 commands the network interface 206 in order to command the transfer of a message through the communication network 50 in order to notify the server Sery that PCI collision is occurring.

The message comprises at least the unique identifier of the home base station HBS1 and the PCI of the home base station HBS1.

At next step S803, the processor 200 checks if a message is received from the server Sery in response to the message transferred at step S802.

If a message is received from the server Sery within a given timeframe, the processor 200 moves to step S804. Otherwise, the processor 200 moves to step S809.

The message received at step S803 is a one disclosed at step S604 of FIG. 6.

At step S804, the processor 200 commands the transfer of a message to the mobile terminals MT in the cell, both those in idle mode and those in connected mode, that a system information update will be performed as disclosed at step S506 of FIG. 5.

It has to be noted here that the home base station HBS2 notifies the mobile terminals MT in the cell, both those in idle mode and those in connected mode, that a system information update will be performed.

At next step S805, the processor 200 commands the wireless interface 205 in order to transfer system information to the mobile terminals MT. Both interfered home base station HBS1 and interfering home base station HBS2 transfer in a synchronized manner the same system information, using the same capabilities and the same resources. System information are updated in conformity with the information obtained in the message received at step S803. System information are appended to include the at least one timing offset, the unique home base station HBS identity/identities to which the timing offset(s) correspond, and the moment T0 from which the at least one timing offset will be applied. In a variant, T0 can be a default absolute or relative value predetermined in the system, in which case there is no need of deciding or transmitting this value.

The two colliding home base stations HBS1 and HBS2 are able to coordinate and transmit common broadcast channel as disclosed at step S507 of FIG. 5.

At step S806, the processor 200 commands the wireless interface 205 in order to apply the timing offset at time T0.

At next step S807, the processor 200 commands the wireless interface 205 in order to transfer new system information corresponding to single cell transmission.

The new system information correspond to non-coordinated transmission, for example the one used before step S803. System information update generally includes notifying all the mobile terminals MT, in active or in idle mode, in the cell that SI changes, and then effectively applying the update.

After that, the processor 200 returns to step S800.

At step S808, the processor 200 determines a new timing offset by its own.

At next step S809, the processor 200 of the home base station HBS1 notifies the mobile terminals MT in the cell, both those in idle mode and those in connected mode, that a system information update will be performed as disclosed at step S511 of FIG. 5.

At step S810, the processor 200 commands the wireless interface 205 in order to transfer system information to the mobile terminals MT. System information are appended to include the timing offset determined at step S808, and the moment T0 from which the at least one timing offset will be applied. In a variant, T0 can be a default absolute or relative value predetermined in the system, in which case there is no need of deciding or transmitting this value.

At step S811, the processor 200 commands the wireless interface 205 in order to apply the timing offset at time T0.

At step S812, the processor 200 commands the wireless interface 205 in order to transfer new system information corresponding to normal transmission. Timing offset information is removed from the system information. The new system information correspond to normal transmission, for example the one used before step S804. System information update generally includes notifying all the mobile terminals MT, in active or idle mode, in the cell that SI changes, and then effectively applying the update.

After that, the processor 200 returns to step 800.

It has to be noted here that in a variant, the processor 200 does not execute the steps S808 to S812 and returns to step 800 if no response is received at step S803 within a given timeframe.

FIG. 9 discloses an example of an algorithm executed by each home base station according to the present invention.

More precisely, the present algorithm is executed by the processor 200 of each home base station HBS in parallel with the algorithm of FIG. 5 or 6 or 7 or 8.

The present algorithm is disclosed in an example where it is executed by the home base station HBS2.

At step S900, the processor 200 checks if a message notifying a PCI collision, as disclosed at step S503, is received from a home base station. The message is received from an interfered home base station, for example the home base station HBS1.

If a message notifying a PCI collision is received from a home base station HBS, the processor 200 moves to step S901. Otherwise, the processor 200 moves to step S907.

At step S901, the processor 200 checks if the home base station HBS2 is involved in the PCI collision by comparing the PCI of the home base station HBS2 to the PCI comprised in the message received at step S900. If PCI are identical, the processor 200 moves to step S902. Otherwise, the processor 200 returns to step S900.

At step S902, the processor 200 commands the network interface 206 in order to transfer a response message to the home base station HBS1 identified in the message received at step S900. The home base station HBS2 is an interfering home base station.

At next step S903, the interfered and the interfering home base stations HBS begin a negotiation phase as disclosed at step S505 of FIG. 5.

At next step S904, the processor 200 of the home base station HBS2 commands the transfer of a message to the mobile terminals MT in the cell, both those in idle mode and those in connected mode, that a system information update will be performed. The notification can be sent for example by paging the mobile terminals MT in idle mode, or by using a specific tag in the information that is constantly monitored by the mobile terminals in connected mode. In LTE for example, the mobile terminals MT in connected mode are notified by using a value tag in System Information Block 1 (SIB1) which is incremented every time one or more system information messages change.

It has to be noted here that the home base station HBS1 notifies the mobile terminals MT in the cell, both those in idle mode and those in connected mode, that a system information update will be performed.

At next step S905, the processor 200 commands the wireless interface 205 in order to transfer system information to the mobile terminals MT. Both interfered home base station HBS2 and home base station HBS1 transfer in a synchronized manner the same system information, using the same capabilities and the same resources. System information are updated in conformity with the information obtained during the negotiation phase. System information are appended to include the at least one timing offset, the unique home base station HBS2 identity/identities to which the timing offset(s) correspond, and the moment T0 from which the at least one timing offset will be applied. In a variant, T0 can be a default absolute or relative value predetermined in the system, in which case there is no need of deciding or transmitting this value.

The two colliding home base stations HBS1 and HBS2 are able to coordinate and transmit common broadcast channel, system information and control signaling according to the information directly exchanged in the negotiation phase. The common channels are set up corresponding at most to the capabilities of the less capable home base station HBS involved in the collision. Thus, the radio link with the attached mobile terminals MT can be preserved and global radio link failure is avoided. For instance, in LTE, where multi-antenna transmission is possible, PBCH, PDCCH and PDSCH carrying SIB must be sent using at most the number of antennas of the HBS having the least number of antennas among the two colliding home base stations HBS1 and HBS2.

At step S906, the processor 200 commands the wireless interface 205 in order to apply the timing offset at time T0.

At next step S907, the processor 200 commands the wireless interface 205 in order to transfer new system information corresponding to single cell transmission.

The new system information correspond to non-coordinated transmission, for example the one used before step S902. System Information update generally includes notifying all the mobile terminals MT, in active or in idle mode, in the cell that SI changes, and then effectively applying the update.

After that, the processor 200 returns to step S900.

At step S908, the processor 200 checks if a message notifying a PCI collision is received from the server Serv.

If a message notifying a PCI collision is received from the server Serv, the processor 200 moves to step S909. Otherwise, the processor 200 returns to step S900.

The message received at step S908 is identical to the message disclosed at step S604 of FIG. 6.

At step S909, the processor 200 of the home base station HBS2 commands the transfer of a message to the mobile terminals MT in the cell, both those in idle mode and those in connected mode, that a system information update will be performed. The notification can be sent for example by paging the mobile terminals MT in idle mode, or by using a specific tag in the information that is constantly monitored by the mobile terminals in connected mode.

It has to be noted here that the home base station HBS1 notifies the mobile terminals MT in the cell, both those in idle mode and those in connected mode, that a system information update will be performed.

At next step S910, the processor 200 commands the wireless interface 205 in order to transfer system information to the mobile terminals MT. Both interfered home base station HBS1 and home base station HBS2 transfer in a synchronized manner the same system information, using the same capabilities and the same resources.

System information are updated in conformity with the information comprised in the message received at step S908. System information are appended to include the at least one timing offset, the unique home base station HBS2 identity/identities to which the timing offset(s) correspond, and the moment T0 from which the at least one timing offset will be applied. In a variant, T0 can be a default absolute or relative value predetermined in the system, in which case there is no need of deciding or transmitting this value.

The two colliding home base stations HBS1 and HBS2 are able to coordinate and transmit common broadcast channel, system information and control signaling according to the information comprised in the message received at step S908. The common channels are set up corresponding at most to the capabilities of the less capable home base station HBS involved in the collision. Thus, the radio link with the attached mobile terminals MT can be preserved and global radio link failure is avoided. For instance, in LTE, where multi-antenna transmission is possible, PBCH, PDCCH and PDSCH carrying SIB must be sent using at most the number of antennas of the HBS having the least number of antennas among the two colliding home base stations HBS1 and HBS2.

At step S911, the processor 200 commands the wireless interface 205 in order to apply the timing offset at time T0.

At next step S912, the processor 200 commands the wireless interface 205 in order to transfer new system information corresponding to single cell transmission.

The new system information correspond to non-coordinated transmission, for example the one used before step S908. System Information update generally includes notifying all the mobile terminals MT, in active or in idle mode, in the cell that SI changes, and then effectively applying the update.

After that, the processor 200 returns to step S900.

It has to be noted here that in ah-hoc networks only steps S900 to S907 are executed. In hierarchical networks where a server is present and where home base stations HBS are not capable of directly communicating only steps S908 to S912 are executed.

FIG. 10 discloses an example of an algorithm executed by a server according to the present invention.

More precisely, the present algorithm is executed by the processor 400 of the server Serv.

At step S1000, the processor 400 checks if a PCI collision is detected.

For example, a PCI collision is detected when the server Sery receives at least one message from a home base station notifying that a PCI collision is detected or using positioning information of home base stations HBS having the same PCI and being synchronized.

If a PCI collision is detected, the processor 400 moves to step S1001. Otherwise, the processor 400 returns to step S1000.

At next step 1001, the processor 400 identifies the home base stations HBS involved in PCI collision.

For example, using positioning information, the processor 400 identifies home base stations sharing the same PCI within an area.

For example, if two messages notifying a PCI collision and comprising the same PCI are received at step S1000, the processor 400 identifies both home base stations which sent the messages as interfering.

At next step S1002, the processor 400 determines at least one non-null timing offset between the home base stations HBS involved in the PCI collision in order to desynchronize the home base stations HBS involved in the PCI collision. Also, a moment T0 from which the at least one timing offset will be applied is also determined. Furthermore, capabilities, like the number of antennas of the home base stations HBS and/or MIMO capabilities, of the less capable home base station involved in the PCI collision are determined and at most the capabilities of the less capable home base station HBS are selected. Any other information allowing the two home base stations HBS involved in the PCI collision to align the transmission of their system information is also determined. Such information may include, for example, in addition to the system information itself, control signaling information for the scheduling of the part of system information embedded in the downlink shared channel.

It has to be noted that two different timing offsets may be defined, one for each home base station HBS involved in the PCI collision.

At next step 1003, the processor 400 commands the network interface 406 in order to transfer the parameters determined at step S1002 to the home base stations HBS involved in the PCI collision.

FIG. 11 discloses an example of an algorithm executed by a mobile terminal according to the first and second modes of realization of the present invention.

The present algorithm is executed by at least one mobile terminal MT served by a home base station HBS1 or HBS2.

The at least one mobile terminal MT executes the present algorithm for example upon request of its serving home base station.

More precisely, the present algorithm is executed by the processor 300 of the mobile terminal MT.

At step S1100, the processor 300 detects the reception of pilots and data through the wireless interface 305.

At next step S1101, the processor 300 commands the wireless interface in order to decode the data.

At next step S1102, the processor 300 checks if correct data decoding is performed by using for example a cyclic redundancy check.

If data are correctly decoded, the processor 300 moves to step S1103. Otherwise, the processor 300 moves to step S1104.

At step S1103, the processor 300 computes the level of estimated interference on the data part, $X_d$. The level of estimated interference on the data part is performed by evaluating the average value of the square difference between the received noisy and/or interfered data symbol $y_d$ and the estimated data symbol affected by the estimated channel.

This value $X_d$ may be computed by averaging over several decoded frames.

At each correctly decoded frame, information representative of the level of interference experienced on the data part is stored, and averaging is made by also taking into account the information relative to the previously correctly decoded frames. Averaging can be done in many ways, for example by using a fixed window, a sliding window, weighted averaging, etc. . . . . .

Alternatively, at this step, only information representative of the level of interference experienced on the data part is stored, and all averaging computations are transferred at step S1106.

After that, the processor 300 moves to step S1104.

At step S1104, the processor 300 computes the level of estimated interference on the pilots $X_p$. The level of estimated interference on the pilots is performed by evaluating the average value of the square difference between the noisy and/or interfered received pilot symbol $y_p$ and the sent pilot symbol affected by the estimated channel.

This value $X_p$ may be computed by averaging over several decoded frames. At each decoded frame, information representative of the level of interference experienced on the pilot part is stored, and averaging is made by also taking into account the information relative to the previously decoded frames. $X_p$ can be computed by averaging over correctly and incorrectly decoded frames.

Alternatively, at this step, only information representative of the level of interference experienced on the pilot part is stored, and all averaging computations are reported at step S1106.

In a variant of realization, the processor 300, instead of moving from steps S1102 to S1104 if data are not correctly decoded, moves from steps S1102 to S1105, i.e. information representative of the level of interference experienced only on the pilot part of correctly decoded frames is computed. Averaging can be made by also taking into account the information representative of the level of interference experienced on the pilot part of previously correctly decoded frames. Alternatively, at this step, only information representative of the level of interference experienced on the pilot part only in the case of correct decoding is stored, and all averaging computations are reported at step S1106.

At next step S1105, the processor 300 checks if enough samples have been taken for the average computing.

Averaging is done over time/frequency periods capable of giving sufficiently reliable statistics but without penalizing the decision time. These periods should be long enough to give reliable statistics, for example be at least within the order of the coherence time/coherence bandwidth of the channel. These periods should be short enough in order to allow fast reaction from the mobile terminal MT when the channel conditions are changing.

Coherence time/coherence bandwidth are statistical measures that describe the time/frequency varying nature of the channel in a small scale region. Coherence time is a statistical measure of the time duration over which the channel impulse response is essentially invariant. Coherence bandwidth is the range of frequencies over which two frequency components have a strong potential for amplitude correlation. These measures are well described in the literature for example in the book of Theodore S. Rappaport, entitled Wireless communications-Principles and practice.

If enough samples have been taken for a reliable average computing, the processor 300 moves to step S1106. Otherwise, the processor 300 returns to step S1100.

At next step S1106, the processor 300 computes $X_d$, $X_p$ if they were not previously calculated, and then computes the difference $X_d-X_p$ between the level of estimated interference on the data part when correct detection was achieved, $X_d$, and the level of estimated interference on the pilot part, $X_p$.

At next step S1107, the processor 300 checks if the calculated value $X_d-X_p$ is upper than a given threshold Thres.

The threshold Thres is for example determined through simulation or empirical measurements. For example, the threshold Thres is determined in order to have a certain target missed detection probability.

If the calculated value $X_d-X_p$ is upper than the threshold Thres, the processor 300 moves to step S1108. Otherwise, the processor 300 returns to step S1100.

At next step S1108, the processor 300 commands the wireless interface 305 in order to transfer a message to the home base station HBS the mobile terminal MT is attached to notifying that a PCI collision is detected.

After that, the processor 300 returns to step S1100.

FIG. 12 discloses an example of an algorithm executed by a mobile terminal according to the present invention when the mobile terminal is served by a home base station and when a PCI collision avoidance procedure is undergoing.

More precisely, the present algorithm is executed by the processor 300 of each mobile terminal.

At step S1200, the processor 300 checks if a system information update notification is received through the wireless interface 305. System Information update is as the one disclosed at step S506 or S511 of FIG. 5.

The mobile terminal MT regularly monitors for system information updates.

If a system information update message is received, the processor 300 moves to step S1201 and receives updated system information. The processor 300 receives the at least one timing offset, the unique home base station HBS identity/identities to which the timing offset(s) corresponds, and the moment T0 from which the at least one timing offset will be applied. In a variant, T0 can be a default absolute or relative value predetermined in the system and stored in the memory 303 of the mobile terminal MT.

Otherwise, the processor 300 returns to step 1200.

At step S1202, the processor 300 commands the wireless interface 305 in order to apply the timing offset at time T0 if one timing offset is received together with information identifying its serving home base station.

If plural timing offsets are received, the processor 300 identifies which timing offset corresponds to its serving home base stations HBS among the received timing offsets.

FIG. 13 discloses an example of an algorithm executed by a mobile terminal according to the present invention when the mobile terminal is not served by a home base station.

The present algorithm is executed by the mobile terminal MT once a radio link failure occurs.

More precisely, the present algorithm is executed by the processor 300 of the mobile terminal MT.

At step S1300, the processor 300 commands the wireless interface in order to synchronize the mobile terminal to a home base station HBS.

At next step S1301, the processor 300 checks if the PCI of the home base station HBS the mobile terminal MT is synchronized to is identical to the PCI of the home base station HBS serving the mobile terminal MT before the radio link failure occurred.

If the PCIs are different, the processor 300 interrupts the present algorithm. Otherwise, the processor 300 moves to step S1302.

At step S1302, the processor 300 checks if system information transferred by the home base station HBS to the mobile terminal MT is synchronized to can be read.

If system information can be read, the processor 300 moves to step S1303 and reads the system information. Otherwise, the processor 300 moves to step S1306.

At step S1306, the processor 300 commands the transfer, through the wireless interface 305, of a random access request on a random access channel (RACH) based on the previous system information known before the Radio Link Failure and which might be outdated.

For example, the random access request comprises a specific bit indicating PCI collision or comprises a temporary identifier, with a preamble specific to PCI collision occurrence. The preamble may be signalled by the serving home base station HBS in the system information or may be predefined in the wireless cellular telecommunication network or may be transferred to the mobile terminal MT through Radio Resource Control (RRC).

According to a particular feature, a RACH resource dedicated for PCI collision signaling can be reserved in the uplink channel at a specific position in the time/frequency/code domain for all home base stations HBS. Therefore, the random access request sent by the mobile terminal MT trying to inform its serving home base station of the PCI collision can be read by any synchronized and potentially interfering home base station HBS in the neighborhood. The random access request contains the PCI and possibly the unique identifier of the home base station which was serving the mobile terminal MT before the radio link failure in order to enable the interfering home base station to detect that it is involved in a PCI collision event.

After that, the processor 300 returns to step S1300.

At step S1304, the processor 300 checks if at least one timing offset is received through the wireless interface 305.

If at least one timing offset is received through the wireless interface 305, the processor 300 moves to step S1305. Otherwise, the processor 300 interrupts the present algorithm.

At step S1305, the processor 300 commands the wireless interface 305 in order to apply the timing offset at time T0 if one timing offset is received together with information identifying the home base station HBS which was serving the mobile terminal MT before the radio link failure.

If plural timing offsets are received, the processor 300 identifies which timing offset corresponds to the home base station HBS which was serving the mobile terminal MT before the radio link failure among the received timing offsets.

Naturally, many modifications can be made to the embodiments of the invention described above without departing from the scope of the present invention.

The invention claimed is:

1. A method for enabling a mobile terminal to continue to be served by a home base station when the mobile terminal is in a coverage area of the serving home base station and a coverage area of the serving home base station starts superposing with the coverage area of another home base station, the other home base station having a same physical cell identity (PCI) and being synchronized with the serving home base station, each home base station broadcasting the physical cell identifier in its coverage area, the method comprising:
   determining, by at least one of the home base stations, that the coverage areas start superposing;
   determining, by the at least one of the home base stations, a value of at least one modified timing offset to be applied at a predetermined moment for transferring signals in its cell, the modified timing offset having a different value than a current timing offset of the at least one of the home base stations;
   transmitting, by the at least one of the home base stations, to the mobile terminal the value of the at least one modified timing offset and the predetermined moment identifying a time at which the at least one modified timing offset is applied for transferring signals in its cell; and
   applying, by the at least one of the home base stations, the at least one modified timing offset at the predetermined moment.

2. The method according to claim 1, further comprising:
   obtaining information allowing the two home base stations to perform a coordinated transmission of at least system information, the coordinated transmission being the transmission by the serving home base station and the other home base station of same information on same radio resources at a same time;
   transmitting to the mobile terminal information enabling the mobile terminal to receive the coordinated transmission; and
   transferring the at least one timing offset and the moment in the coordinated transmission.

3. The method according to claim 2, wherein the serving home base station and the other home base station further transmit to all other mobile terminals located in their coverage areas information enabling the mobile terminals to receive the coordinated transmission and transmit in the coordinated transmission to all other mobile terminals located in their coverage areas the at least one timing offset and the moment.

4. The method according to claim 1, further comprising:
   broadcasting, by the home base station serving the mobile terminal, a message to neighbouring home base stations;
   receiving, by the home base station serving the mobile terminal, from at least one of the neighbouring home base stations, a message in response to the broadcasted message; and
   identifying, by the home base station serving the mobile terminal, the other or each other home base station having a same physical identity as the one or each of the ones from which the response message is received.

5. The method according to claim 1, wherein the determining that the coverage areas start superposing is performed from at least one message transferred by at least one mobile terminal, the message notifying that the mobile terminal detects a collision that occurs from the reception of both physical cell identifiers.

6. The method according to claim 5, further comprising, executed by the mobile terminal:
   computing a level of estimated interference on data received by the mobile terminal;
   computing a level of estimated interference on pilot symbols received by the mobile terminal; and
   detecting the collision from the computed level of estimated interference on data received by the mobile terminal and from the computed level of estimated interference on pilot symbols received by the mobile terminal.

7. The method according to claim 1, wherein the determining that the coverage areas start superposing is performed by the home base station serving the mobile terminal.

8. The method according to claim 7, wherein the value of the at least one modified timing offset is determined by both home base stations.

9. The method according to claim 1, wherein the value of the at least one modified timing offset is determined by the home base station serving the mobile terminal.

10. The method according to claim 1, wherein the determining that the coverage areas start superposing is performed by a server.

11. The method according to claim 1, wherein the value of the at least one modified timing offset is determined by a server in charge of both home base stations.

12. The method according to claim 10, further comprising, executed by the server, identifying the other home base station having the same physical cell identity as the physical cell identity of home base station serving the mobile terminal.

13. The method according to claim 1, further comprising, executed by the mobile terminal, applying the modified timing offset at the predetermined moment.

14. A system for enabling a mobile terminal to continue to be served by a home base station when the mobile terminal is in a coverage area of the serving home base station and a coverage area of the serving home base station starts superposing with the coverage area of another home base station, the other home base station having a same physical cell identity and being synchronized with the serving home base station, each home base station broadcasting the physical cell identifier in its coverage area, the system comprising:
   circuitry, implemented by at least one of the home base stations, configured to
   determine that the coverage areas start superposing;
   determine a value of at least one modified timing offset to be applied at a predetermined moment for transferring signals in its cell, the modified timing offset having a different value than a current timing offset of the at least one of the home base stations;
   transmit to the mobile terminal the value of the at least one modified timing offset and the predetermined moment identifying a time at which the at least one modified timing offset is applied for transferring signals in its cell; and apply the at least one modified timing offset at the predetermined moment.

15. A non-transitory computer readable medium including a computer program which can be directly loadable into a home base station in a system for enabling a mobile terminal to continue to be served by the home base station when the mobile terminal is in a coverage area of the serving home base station and a coverage area of the serving home base station starts superposing with the coverage area of another home base station, the other home base station having a same physical cell identity and being synchronized with the serving home base station, each home base station broadcasting the physical cell identifier in its coverage area, the method comprising:

determining that the coverage areas start superposing;

determining a value of at least one modified timing offset to be applied at a predetermined moment for transferring signals in its cell, the modified timing offset having a different value than a current timing offset of the at least one of the home base stations;

transmitting to the mobile terminal the value of the at least one modified timing offset and the predetermined moment identifying a time at which the at least one modified timing offset is applied for transferring signals in its cell; and applying the at least one modified timing offset at the predetermined moment.

16. The method according to claim 1, wherein the value of the at least one modified timing offset is determined by a negotiation between the serving home base station and the other home base station.

\* \* \* \* \*